United States Patent
Van De Witte et al.

(10) Patent No.: US 6,459,847 B1
(45) Date of Patent: Oct. 1, 2002

(54) PATTERNED LAYER OF A POLYMER MATERIAL HAVING A CHOLESTERIC ORDER

(75) Inventors: Peter Van De Witte, Eindhoven (NL); Johan Lub, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/601,753

(22) PCT Filed: Dec. 6, 1999

(86) PCT No.: PCT/EP99/09711
§ 371 (c)(1),
(2), (4) Date: Aug. 7, 2000

(87) PCT Pub. No.: WO00/34808
PCT Pub. Date: Jun. 15, 2000

(30) Foreign Application Priority Data

Dec. 7, 1998 (EP) .............................................. 98204151
Aug. 13, 1999 (EP) .............................................. 99202635

(51) Int. Cl.⁷ ................................................ G02B 6/00
(52) U.S. Cl. ...................................... 385/147; 349/115
(58) Field of Search .................................. 349/115, 176, 349/86, 88; 252/299.7; 359/91, 105; 385/147

(56) References Cited

U.S. PATENT DOCUMENTS 5,668,614 A * 9/1997 Chien et al. ............. 252/299.7
5,793,456 A 8/1998 Broer et al. ................. 349/98

FOREIGN PATENT DOCUMENTS

GB 2314167 12/1997 ......... G02F/1/1335

\* cited by examiner

Primary Examiner—Akm E. Ullah
(74) Attorney, Agent, or Firm—Aaron Waxler

(57) ABSTRACT

The invention relates to a method of manufacturing a patterned layer of a polymer material having a cholesteric order, in which the material is oriented in such a way that the axis of the molecular helix of the cholesterically ordered material extends transversely to the layer, and in which the layer is patterned in that it comprises at least one region in which the pitch of the molecular helix differs from that of another region. This inventive method comprises the following steps:

a. providing a layer of a cholesterically ordered material comprising a quantity of a convertible compound which in its non-converted and in its converted state determines the pitch of the cholesterically ordered material to a different extent, in which the conversion of said compound may be induced by radiation, b. irradiating the layer in accordance with a desired pattern so that at least a part of the convertible compound in the irradiated parts of the layer is converted, c. polymerizing and/or crosslinking the cholesterically ordered material to form a three-dimensional polymer.

The convertible compound preferably comprises an isomerizable, chiral compound. Polymerization and/or crosslinking are preferably induced by irradiation using electron-beam radiation or actinic radiation.

19 Claims, 5 Drawing Sheets

PATTERNED LAYER OF A POLYMER MATERIAL HAVING A CHOLESTERIC ORDER

BACKGROUND OF THE INVENTION

The invention relates to a method of manufacturing a patterned layer of a cholesterically ordered polymer material, in which the axis of the molecular helix of the cholesterically ordered material extends transversely to the layer, and the layer is patterned in that it has at least an area in which the pitch of the molecular helix differs from that of another area.

SUMMARY OF THE INVENTION

The invention also relates to a layer of a cholesterically ordered polymer material.

The invention further relates to an information carrier provided with a patterned layer of a polymer material having a cholesteric order.

The invention further relates to a polarization conversion system provided with a patterned layer of a cholesterically ordered material.

The invention further relates to a cholesteric color filter having a patterned layer of a cholesterically ordered material.

The method of the type described in the opening paragraph is known per se. For example, United Kingdom patent specification GB 2,314,167 describes a patterned layer of a cholesterically ordered material. In accordance with this patent specification, such a layer may be manufactured by first providing a uniform layer of a cholesteric material on a substrate. By polymerizing areas of this layer at different temperatures, a patterned cholesteric layer is obtained. Use is made of the fact that the pitch of the molecular helix of the cholesterically ordered material is temperature-dependent. By polymerizing areas of the layer at a given temperature, the pitch associated with this temperature is, as it were, frozen in these areas.

The known method has drawbacks. For example, in practice it has been found that the known method is difficult to implement. This notably applies to the case where more than two areas having mutually different pitches must be provided in the layer. In that case, a relatively large number of masking steps is necessary and the precision with which the masks are adjusted is very critical. Moreover, the maximum difference in pitch which can be realized between the different areas by means of the known method appears to be relatively small. Patterning at different temperatures also appears to be difficult in practice.

It is an object of the invention to obviate the known drawbacks. More particularly, it is an object of the invention to provide a method in which the layer can be patterned at the same temperature and in which relatively large pitch differences between the different areas can be realized. It is a further object of the invention to provide a polarization conversion system having a patterned layer of a cholesterically ordered material, and a cholesteric color filter having a patterned layer of a cholesterically ordered material, manufactured by means of this method.

These and other objects of the invention are achieved by means of a method of the type described in the opening paragraph, wherein the method comprises the steps of:

a. providing a layer of a cholesterically ordered material comprising a quantity of a convertible compound which in its non-converted and in its converted state determines the pitch of the cholesterically ordered material to a different extent, in which the conversion of said compound may be induced by radiation, b. irradiating the layer in accordance with a desired pattern so that at least a part of the convertible compound in the irradiated parts of the layer is converted, c. polymerizing and/or crosslinking the cholesterically ordered material to form a three-dimensional polymer.

It has been found that, using the method according to the invention, that patterned layers of cholesterically ordered, liquid crystalline material can be manufactured in a simple way at the same temperature, with the maximum pitch difference between the areas being relatively large. By (partially) converting the convertible compound in the irradiated areas of the layer, the pitch of the molecular helix in the layer is altered in these areas. The conversion of the convertible compound is effected by irradiation with energy in the form of, for example, electromagnetic radiation, nuclear radiation or an electron beam. Preferably said conversion is effected by means of UV radiation. The pitch of the molecular helix in the irradiated parts differs from the pitch of the molecular helix in the non-irradiated parts of the layer. By polymerizing and/or crosslinking the patterned layer thus obtained, the pitch in the different layer parts is frozen, as it were, and said pitch remains fixed during further process steps, storage and use of the patterned layer. In this way, a patterned layer of cholesterically ordered material can be manufactured in a simple manner.

The degree of conversion of the convertible compound in a certain area is determined by the irradiation dose in said area. Consequently, the pitch of the molecular helix is determined by the local irradiation dose. Said pitch of the molecular helix determines the local optical properties.

It is to be noted that, preferably, the cholesteric layer has a low absorbance for the radiation used in step b, and the radiation intensity along the axis of the helix (i.e. transverse to the layer) is relatively constant in each area. Consequently, the irradiation dose transverse to the layer is relatively constant, and therefore the value of the pitch, viewed along the axis of the helix, is relatively constant in each area. However, this value may differ for the different areas obtained by patterning. Viewed in the plane of the layer, the different areas are adjacent to each other, not subjacent.

When the cholesteric layer has a high absorbance for the radiation used in step b, the radiation intensity will show a gradient transverse to the layer according to Beer-Lambert's law. Consequently, the top of the layer will receive more radiation than the bottom of the layer. This will lead to the formation of a gradient in the pitch, viewed along the axis of the helix (i.e. transverse to the layer). The presence of an absorbing material in a non-absorbing cholesteric layer yields also a gradient in the pitch.

A variation in the pitch, transverse to the cholesteric layer, can be obtained by a method of manufacturing a layer of a cholesterically ordered polymer material, in which the material is oriented in such a way that the axis of the molecular helix of the cholesterically ordered material extends transversely to the layer, wherein the method comprises the following steps:

a. providing a layer comprising a cholesterically ordered material, which material comprises a quantity of a convertible compound which in its non-converted and in its converted state determines the pitch of the cholesterically ordered material to a different extent, the conversion of said compound being inducible by radiation, and the layer substantially absorbs said radiation.

b. irradiating the layer so that at least a part of the convertible compound in the irradiated parts of the layer is converted, c. polymerizing and/or crosslinking the cholesterically ordered material to form a three-dimensional polymer.

According to the prior art, a gradient in the pitch transverse to the layer could be obtained by a method described in the U.S. Pat. No. 5,793,456 (PHN 14.629), which discloses a method of manufacturing a cholesteric polarizer by providing a mixture of chiral and nematogenic monomers, each having a different reactivity, in the form of a layer. The pitch of the molecular helix is governed to an important degree by the ratio between the chiral and the mesogenic monomer in the polymer material. Owing to the difference in reactivity between both monomers, the capture probability of the most reactive monomer is greater than that of the least reactive monomer. If during the polymerization of the mixture, which is initiated by actinic radiation, a variation in the radiation intensity is realized across the optically active layer to be formed, the most reactive monomer is preferably incorporated in the polymer at the locations of the highest radiation intensity. As a result, one or more concentration gradients of free monomer are formed during said polymerization process, causing monomer diffusion from locations with a low monomer concentration to locations with a high monomer concentration. This leads to an increase in reactive monomers in areas of the formed polymer material where, during the polymerization process, the radiation intensity was highest. As a result, the composition of the polymer material varies in the direction transverse to the polymer layer, causing a variation in the pitch of the molecular helix in the layer, which molecular helix is formed by the polymer. This variation of the pitch provides the optically active layer with a large bandwidth, the value of which is proportional to the value of the variation in pitch.

The known method of U.S. Pat. No. 5,793,456 has drawbacks. For example, the speed of the process is governed by the diffusion of the monomer molecules which is an inherently slow process. The present invention provides a rapid method in which a pitch of the molecular helix can be made to vary transversely to the layer. An additional advantage of the method according to the invention is that the pitch of the cholesterically ordered material is determined by the irradiation dose instead of the irradiation intensity. A certain irradiation dose can be administered in a short timeframe using a high irradiation intensity.

A combination of the method according to claim 15 and the method described in U.S. Pat. No. 5,793,456 is also possible. In said combination the effects of photo-isomerisation and diffusion are combined in order to obtain an even more increased gradient in the pitch of the molecular helix. If during the polymerization of a mixture of a photo-isomerisable chiral compound and a reactive nematogenic monomer, which polymerization is initiated by actinic radiation, a variation in the radiation intensity is realized across the optically active layer to be formed, two effects will cause a gradient in the pitch of the molecular helix. Firstly, due to the variation in the radiation intensity the amount of photo-isomerisable material that is converted will show the same variation across the thickness of the layer. Because the converted state determines the pitch of the cholesterically ordered material to a different extent, said variation in converted material will yield a gradient in the pitch of the molecular helix. Secondly, the reactive nematogenic monomer is preferably incorporated in the polymer at the locations with the highest radiation intensity, as previously described in the third paragraph. As a result, the composition of the polymer material varies in the direction transverse to the polymer layer, causing a gradient in the pitch of the molecular helix, and at the end of the process, the cholesteric layer is crosslinked. When using the proper materials, the gradients of both effects add up to a substantial gradient in the pitch of the molecular helix, in a crosslinked layer, in a short time frame.

Preferably, the photo-isomerisable chiral compound is less reactive than the nematogenic monomer. In this sense, the photo-isomerisable chiral compound may be a chiral acrylate, or even a non-reactive compound, and the reactive nematogenic monomer may be a nematic diacrylate.

It has been found that, using the method according to claim 15, broadband polarizers of cholesterically ordered, liquid crystalline material can be manufactured in a simple way. By (partially) converting the convertible compound in the irradiated areas of the layer, the pitch of the molecular helix in the layer is altered in these areas. The conversion of the convertible compound is preferably effected by means of UV radiation. The degree of conversion of the convertible compound is determined by the irradiation dose. Consequently, the pitch of the molecular helix is determined by the local irradiation dose. Said pitch of the molecular helix determines the local optical properties. By polymerizing and/or crosslinking the layer thus obtained, the pitch in the different layer parts is frozen, as it were. In this way, a layer of cholesterically ordered material can be manufactured in a simple manner.

In contrast, when the cholesteric layer has a low absorbance for the radiation used in step b, the radiation intensity along the axis of the helix (i.e. transverse to the layer), is relatively constant over the cross-section of the layer. Consequently, the irradiation dose transverse to the layer is relatively constant, and therefore the value of the pitch, viewed along the axis of the helix, is relatively constant in each area, yielding a small bandwidth (approximately 60–70 nm).

An embodiment of the method according to claim 3 wherein the irradiation dose in accordance with step b decreases from the top to the bottom of the cholesteric layer, is characterized in that, at the bottom of the cholesteric layer, said irradiation dose is less than 0.9 times the irradiation dose at the top of said layer.

When the cholesteric layer is caused to absorb the radiation used in accordance with step b, the radiation intensity will show a gradient transverse to the layer according to Beer-Lambert's law. Consequently, the top of the layer will receive more radiation than the bottom of the layer. Said variance in the irradiation dose over the cross-section of the layer will lead to the formation of a gradient in the pitch of the molecular helix, viewed along the axis of the helix (i.e. transverse to the layer). This gradient in the pitch provides the optically active layer with a larger bandwidth, the value of which is proportional to the value of the variation in the pitch. When the cholesteric material's absorbance of the radiation used in method step b is to small to produce the desired gradient in the pitch of the molecular helix in a certain amount of time, an absorbing material may be added to the cholesteric layer to obtain the required absorbance.

A preferred embodiment of the method according to claim 3 is characterized in that, at the bottom of the cholesteric layer, the irradiation dose in accordance with step b is less than 0.75 times the irradiation dose at the top of said layer. Said preferred variation of the irradiation dose across the thickness of the cholesteric layer yields a reflection band, which may span a substantial part of the visible spectrum.

From the description above, it is obvious that the pitch of the molecular helix in a layer of cholesterically ordered material can be suitably adjusted, yielding materials with special optical properties.

An interesting embodiment of the method according to the invention is characterized in that irradiation in accordance with step b is performed such that the irradiation dose is different for at least two different areas of the layer. By using this measure, it is possible to manufacture patterned cholesterically ordered layers which have juxtaposed areas, as viewed in the plane of the layer, with a different value of the pitch of the molecular helix. The different irradiation doses may be realized by using different irradiation periods at a substantially constant intensity. Alternatively, the different irradiation doses may be realized by using a higher irradiation intensity at a substantially constant irradiation period.

Preferably, however, masks are used having a number of apertures which have a different transmissivity to the radiation used. In that case, three or more areas in which the pitch of the molecular helix is different can be obtained in one irradiation step, using one mask.

In principle, a large number of types of convertible compounds influencing the pitch of the molecular helix of cholesterically ordered material may be used within the scope of the invention. In the first place, convertible chiral compounds are feasible, which, due to irradiation, fall apart into non-chiral compounds. The presence of chiral compounds promotes the formation of a cholesteric ordering in a liquid crystalline solution. Irradiation of selected areas of a cholesterically ordered layer with decomposable chiral compounds leads to an increase of the pitch of the molecular helix in these areas.

Another advantageous embodiment of the method according to the invention is characterized in that the convertible compound comprises an isomerizable, chiral compound. The different isomeric forms of such an isomerizable chiral compound usually have a different influence on the pitch of the molecular helix of the cholesterically ordered material. By locally changing the ratio of these isomeric forms by way of irradiation, the pitch is changed. This provides an elegant possibility of manufacturing patterned layers of a polymer material with a cholesteric ordering and a different pitch. To prevent diffusion of the isomerizable, chiral compound in the patterned layer, this compound is preferably bound via a chemical bond to the liquid crystalline polymer material having the cholesteric order. In the latter case, the UV stability of the patterned layer also appears to have been improved.

The cholesterically ordered material used in the method according to the invention comprises liquid crystalline monomers, liquid crystalline oligomers and/or liquid crystalline linear polymers with reactive groups. Due to the presence of these reactive groups, this material can be converted into a polymer material by polymerization and/or into a three-dimensional molecular network by crosslinking. For the reactive groups, notably epoxy groups, vinyl ether groups and/or thiolene groups are suitable. Particularly suitable reactive groups are those of the (meth)acrylate type. It has been found that cholesterically ordered polymer layers having a high optical quality can be obtained with these types of reactive groups. It is to be noted that, when using linear polymers, only crosslinking is necessary for obtaining a three-dimensional network. However, when monomers and/or oligomers are used, polymerization and crosslinking should take place for obtaining the envisaged three-dimensional molecular network. The stabilizing of the cholesteric layer in process step c after selective adjustment of the pitch of the cholesterically ordered layer in process step b, is an important step in the method according to the invention.

An embodiment of the method according to the invention is therefore characterized in that the polymerization and/or crosslinking is initialized and/or catalyzed by the addition of an initiator or catalyst from the fluid or gaseous phase. Said addition is preferably performed after steps a en b in accordance with the invention in order to prevent a polymerization and/or crosslinking reaction during steps a and b. Various initiators and catalysts are applicable.

A further embodiment of the method according to the invention is therefore characterized in that polymerization and/or crosslinking is induced by a thermally decomposable initiator. In that case, the layer of cholesterically ordered material preferably comprises a small quantity of a thermally decomposable polymerization initiator. Said initiator is inactive during process step b according to the invention. Subsequently, the polymerization and/or crosslinking of process step c, may be effected by activating the initiator at an elevated temperature.

An embodiment of the method according to the invention is characterized in that polymerization and/or crosslinking is effected by means of electron-beam irradiation. Very hard layers can be manufactured by means of this method. In this variant of the method according to the invention, it is not necessary to use a polymerization initiator.

An embodiment of the method according to the invention is characterized in that polymerization and/or crosslinking is effected by exposure to actinic radiation. The polymerization and/or crosslinking of a layer of the cholesterically ordered material (step c) can take place in the presence of a photo-initiator by using actinic radiation such as UV radiation. An advantage of using photo-polymerization is that this method permits local polymerization and/or crosslinking in very small areas.

Since the conversion of the convertible compound (step b) is also preferably effected by means of UV radiation, step b and step c of the method claimed may interfere with one another. In order to disentangle these method steps, the next three preferred embodiments of the method, as described below, may be used:

A first preferred embodiment of the method according to the invention is characterized in that the irradiation in accordance with step b is performed at a temperature, at which the polymerization and/or crosslinking reaction is substantially hampered. The polymerization and/or crosslinking reaction rate is temperature-dependent. At a low temperature (at a high viscosity), the polymerization and/or crosslinking reaction is slower than the reorientation of the cholesteric helix, thus allowing the pitch of the cholesterically ordered material to be adjusted with limited or substantially no polymerization and/or crosslinking. At a high temperature (at a low viscosity), the polymerization and/or crosslinking reaction is faster than the reorientation of the cholesteric helix, thus allowing a polymerization and/or crosslinking with a limited or substantially no change in the pitch of the cholesterically ordered material. In conclusion, applying two irradiation steps, each at a different temperature, disentangles method steps b and c.

A second preferred embodiment of the method according to the invention is characterized in that the irradiation in accordance with step b is performed by means of radiation which is substantially inert with respect to the initiation of the polymerization and/or crosslinking reaction. This method uses two irradiation steps, each step using radiation with a different wavelength. According to this embodiment of the method according to the invention, the layer is irradiated in step b with a desired pattern using radiation which is substantially inert with respect to the initiation of the polymerization and/or crosslinking reaction, thus allowing the pitch of the cholesterically ordered material to be adjusted with limited or substantially no polymerization and/or crosslinking. Subsequently, the polymerization and/or crosslinking is effected by means of actinic radiation having a suitable wavelength to initiate polymerization and/or crosslinking. Preferably, but not necessarily, said actinic radiation has a wavelength with a limited or substantially no influence on the pitch of the cholesterically ordered material. If said actinic radiation induces an additional change in the pitch of the cholesterically ordered material, then this must be taken into account when setting the pitch of the cholesterically ordered material in process step b.

A third preferred embodiment of the method according to the invention is characterized in that the irradiation in accordance with step b is performed in an atmosphere which substantially hampers the polymerization and/or crosslinking reaction. This method uses two irradiation steps, each step being performed in a different atmosphere. According to this embodiment of the method according to the invention, the layer is irradiated in step b with a desired pattern in an atmosphere comprising molecules, e.g. oxygen or nitrogen-monoxide, that quench the activated photo-initiators. Said quenching essentially deactivates the activated photo-initiators and thereby hampers the polymerization and/or crosslinking reaction. Consequently, the pitch of the cholesterically ordered material can be adjusted with limited or substantially no polymerization and/or crosslinking. Subsequently, the polymerization and/or crosslinking in accordance with step c is initiated by irradiation in a non-quenching atmosphere, e.g. nitrogen. Preferably, but not necessarily, the second wavelength used for the irradiation in accordance with step c, has a limited or substantially no influence on the pitch of the cholesterically ordered material. If said actinic radiation induces an additional change in the pitch of the cholesterically ordered material, then this must be taken into account when setting the pitch of the cholesterically ordered material in process step b.

The method according to the invention may yield a patterned layer of a polymer material having very interesting optical properties due to the selectively adjusted cholesteric ordering. Said method is particularly suitable for the manufacture of information carriers which may comprise (high resolution) data, text, images, emblems, logos, holograms or gratings.

The invention relates to a layer of a cholesterically ordered polymer material, in which the material is oriented in such a way that the axis of the molecular helix of the cholesterically ordered material extends transversely to the layer, which layer comprises a quantity of a convertible compound which in its non-converted and in its converted state determines the pitch of the cholesterically ordered material to a different extent, and which layer comprises at least one region in which the pitch of the molecular helix differs from that of another region. This layer may be manufactured by means of one of the methods as described hereinbefore.

The invention also relates to an information carrier provided with a patterned layer of a polymer material having a cholesteric order, manufactured by means of one of the methods as described hereinbefore.

The invention further relates to a polarization conversion system provided with a patterned layer of a polymer material having a cholesteric order, manufactured by means of one of the methods as described hereinbefore.

The invention further relates to a color filter with a patterned layer of a polymer material having a cholesteric order, manufactured by means of one of the methods as described hereinbefore.

The invention further relates to a layer of a cholesterically ordered polymer material, in which the material is oriented in such a way that the axis of the molecular helix of the cholesterically ordered material extends transversely to the layer, and the pitch of the molecular helix varies transversely to the layer, said layer being manufactured by means of one of the methods as described hereinbefore.

The invention further relates to a polarizer comprising a layer having a cholesteric order as described in the previous paragraph, which layer is manufactured by means of one of the methods as described hereinbefore.

These and other aspects of the invention are apparent from and will be elucidated with reference to the embodiments described hereinafter.

BRIEF DESCRIPTION OF THE DRAWINGS

In the drawings:

FIG. 2 shows the chemical structural formulas of some compounds used in the methods according to thee invention.

DESCRIPTION OF THE PREFERRED EMBODIMENTS

It is to be noted that, for the sake of clarity, the Figures are not drawn to scale.

Figure 1:
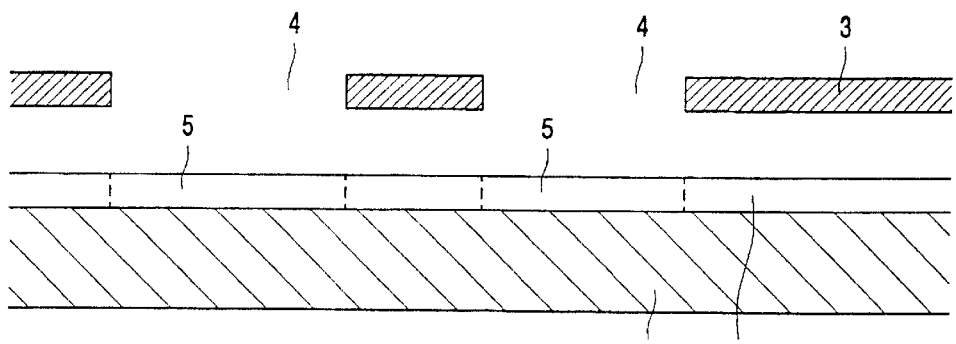
FIG. 1 diagrammatically shows some process steps of the method according to the invention.

The essence of the method according to the invention will be elucidated with reference to FIG. 1. This Figure shows a substrate 1 of, for example glass, a main surface of which is provided with an orientation layer (not shown) of, for example, polyimide. A layer of a liquid crystalline material 2 having a thickness of approximately 2 $\mu$m is provided on this layer by means of a thick-film technique (doctor blade coating or spin-coating). This layer is given a cholesteric order by means of the orientation layer. The material is oriented in such a way that the molecular helix of the cholesterically ordered material extends transversely to the layer.

In the relevant case, the liquid crystalline material consisted of a mixture of compound A (RM82, Merck) to which 0.5% by weight of the isomerizable, chiral compound B (RM) had been added. The chemical structural formulas of these compounds are shown in FIG. 2. The compound B induces the formation of the molecular helix in the liquid crystalline material so that the desired cholesteric order is obtained. In the case described, the helix had a pitch of 7.5 $\mu$m.

Subsequently a mask 3 with apertures 4 was positioned above the layer 2 of the cholesterically ordered liquid crystalline material. Layer 2 was selectively irradiated at ambient temperature for 400 sec using UV radiation (365 nm, 8 mW/cm$^2$). Due to this irradiation, a large part of the isomerizable, chiral compound B in the irradiated parts 5 was converted from the E form to the Z form. These two forms of the chiral compound have a different influence on the helix of the cholesterically ordered material. It has been found that the pitch of the irradiated parts 5 increased from 7.5 to 40 $\mu$m.

After the irradiation, the mask was removed and the layer was irradiated with an electron-beam. As a result, polymerization and crosslinking of the liquid crystalline material took place. During this treatment, the chiral compound was also polymerized so that it was incorporated in the three-dimensional structure of the cholesterically ordered, polymerized material. The patterned layer 2 thus formed was subsequently removed from the substrate 1.

The polymerization and/or crosslinking step may alternatively be accomplished by means of actinic radiation, as the next examples illustrate.

EXAMPLE 1

A mixture is made which is composed of 42.5% of a vitrifying liquid crystal compound D (TetraCN, Tg=80° C.), 13% of compound B (RM), 42.5% of a vitrifying liquid crystal compound E having two acrylic moieties (EtherLC, Tg=−20° C.), and 2% photoinitiator (Irgacure 651, Ciba Specialty Chemicals). This combination of compound D and E yields a reactive mixture, which is vitrified at room temperature. Component B is a photoisomerizable component, which is used to set the pitch of the cholesterically ordered layer. The photo-initiator initiates the polymerization and/or crosslinking reaction.

Mixing is performed at 120° C., yielding a mixture which reflects green light. Said mixture is deposited as a thin film (5 micrometers thick) between two substrates (e.g. glass plates) provided with an orientation layer adjacent to the mixture. Subsequently, this cholestericaly ordered film is cooled down to room temperature, and irradiated with UV light (365 nm) for a short period of time, according to a suitable pattern. Surprisingly, it seems as if the irradiation at room temperature has no effect on the cholesteric film. After irradiation, the temperature of the film was raised to 120° C. During this heating, however, the color of the irradiated areas still underwent a change. The non-irradiated areas did not change color at all. Being at 120° C., the cholesteric film is substantially liquid. The polymerisation and/or crosslinking is subsequently initiated by irradiating with UV light (365 nm) for a short period of time according to a suitable pattern. Immediately after this irradiation at high temperature, the irradiated areas solidify due to polymerization and/or crosslinking. The non-irradiated areas remained in a substantially liquid form.

This example also demonstrates that actinic radiation, such as UV light, can be used for both method steps b and c, and that applying two irradiation steps, each at a different temperature, disentangles method steps b and c.

EXAMPLE 2

Figure 3:
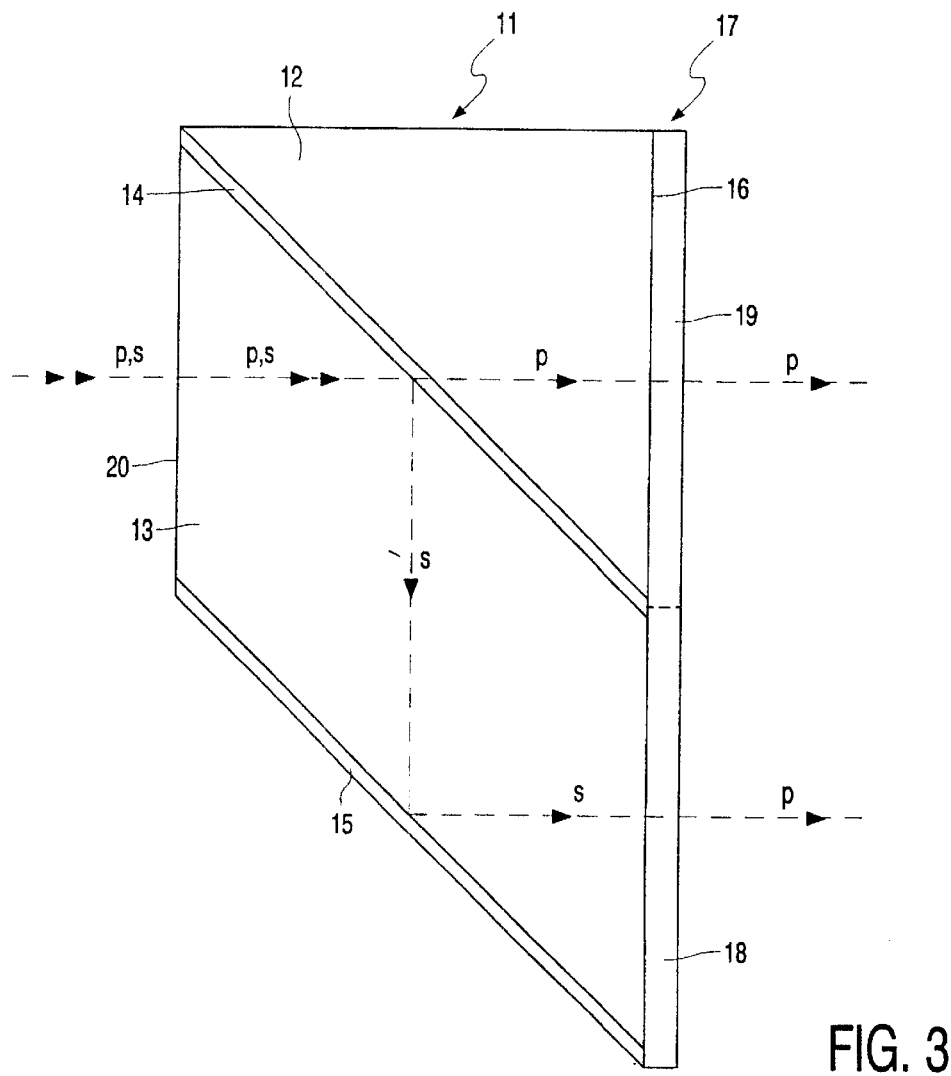
FIG. 3 a diagrammatic cross-sectional view of a polarization conversion system provided with a patterned layer of a polymer material having a cholesteric order, manufactured by means a of method according to the invention.
Figure 2A:
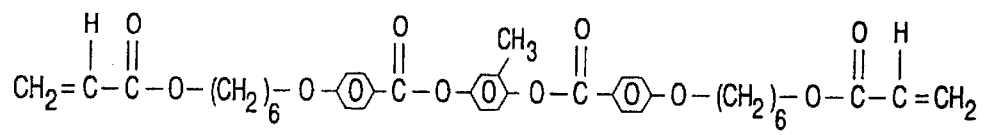
FIG. 2A shows the monomer RM82 (supplied by Merck)
Figure 2B:
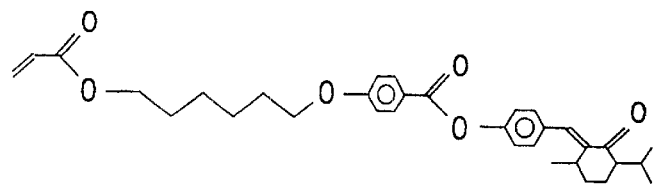
FIG. 2B shows the E isomer of the isomerizable chiral compound (E)-(1R, 4R)-2-(4-(4-hexyloxybenzoyloxy) phenyl-methene) menthan-3-on, which is a reactive menthone (RM)
Figure 2C:
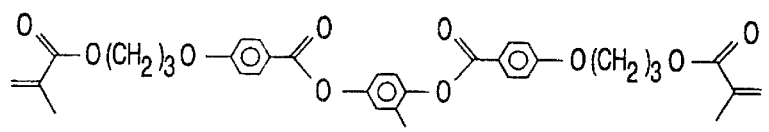
FIG. 2C shows the monomer RM257 (supplied by Merck)
Figure 2D:
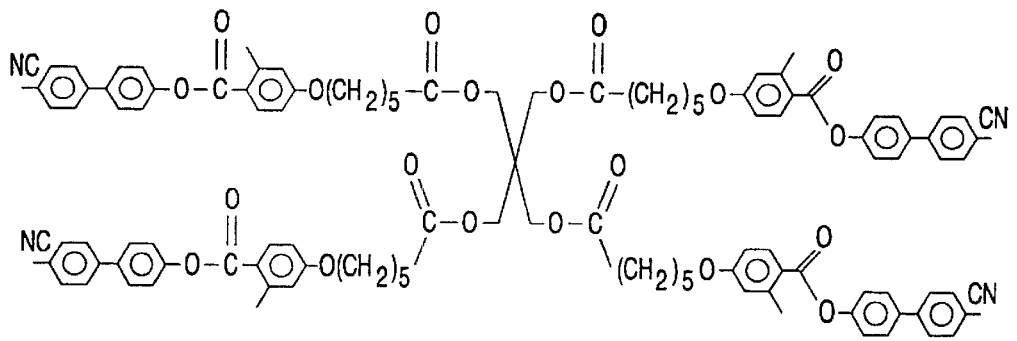
FIG. 2D shows the molecule of the material referred to as TetraCN.
Figure 2E:
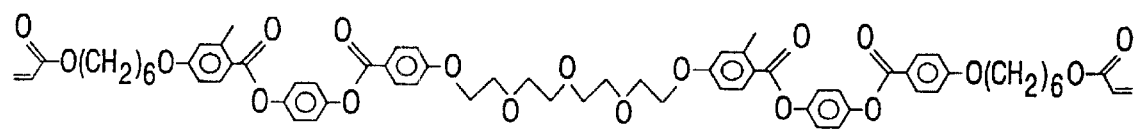
FIG. 2E shows the molecule of the material referred to as EtherLC.
Figure 2F:
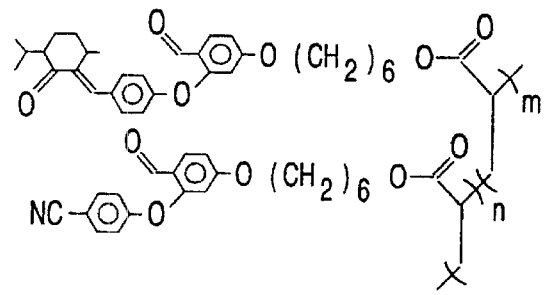
FIG. 2F shows a copolymer having a certain amount of component A as side chains. The copolymer will be referred to as M15, whereby the number represents the mol % of menthone units.

In another example, a mixture is made of 15% of compound B (RM), 84% of compound C (RM257), and 1% Darocure 4265. Darocure 4265 is a photo-initiator which can be activated using 405 nm UV radiation. Said mixture is deposited as a thin film, and subsequently, at room temperature and under ambient atmosphere (air, containing 20% oxygen), irradiated with UV light (365 nm) for a short period of time, according to a suitable pattern. During this irradiation the pitch of the molecular helix in the layer of cholesterically ordered material is altered, and the photo-initiator is activated. However, the polymerization and crosslinking of said layer is hampered because the activated initiator is quenched by the oxygen in the ambient atmosphere. After setting the required pitch, the layer is irradiated with 405 nm UV light under a nitrogen atmosphere. During this irradiation the layer is polymerized and crosslinked with substantially no change in the pitch of the molecular helix in the layer. FIG. 3 is a cross-sectional view of a polarization conversion system. This system comprises an optically transparent body 11 of, for example glass which consists mainly of two parts 12 and 13. These parts are separated by a polarization-selective layer 14. A reflecting mirror 15 which extends substantially parallel to the polarization-selective layer 14 is provided on a surface of one of the two parts.

The exit plane 16 of the system is also provided with a patterned layer 17 of a polymer material having a cholesteric order. This layer comprises two sub-layers 18 and 19. The thickness and cholesteric order of sub-layer 18 are chosen to be such that the direction of polarization of an ongoing, polarized light beam having the desired wavelength is rotated exactly 90°. The cholesteric order of sub-layer 19 is adapted in such a way that the pitch has a substantially infinite value. When a polarized light beam passes through sub-layer 19, the direction of polarization of this beam is not rotated in such a case.

An unpolarized light beam p, s which incidents on the entrance plane 20 of the polarization system, is split on the polarization-selective layer 14 into an ongoing polarized light beam p and a reflected polarized light beam s. The ongoing light beam p leaves the system via exit plane 16 and sub-layer 19. The direction of polarization of this light beam p is not changed when it passes through sub-layer 19. The reflected light beam s is reflected at mirror 15 in such a way that this light beam, which is parallel to light beam p, leaves the system via exit plane 16 and sub-layer 18. The direction of polarization of light beam s is rotated 90° in sub-layer 18 so that a light beam p is obtained. The two exiting light beams thus have the same direction of polarization.

The patterned layer is essentially manufactured in the same way as described with reference to FIG. 1. However, in this case, a synthetic material substrate was used, whose surface dimensions corresponded to the dimensions of the exit plane of the polarization conversion system. The substrate was provided with a 2.5 $\mu$m thick layer of a nematic liquid crystalline compound C to which 0.6% by weight of the isomerizable, chiral compound B (E-isomer) had been added, as well as 0.3% by weight of the non-photoisomerizable compound R811 (Merck, structural formula not shown). The addition of the non-photoisomerizable chiral dopant R811, having an opposite twisting sense with respect to compound B, is required to compensate for the residual twisting power of the Z-isomer of compound B.

After the material had been cholesterically ordered, the pitch of the molecular helix was defined at 10 µm. In combination with a layer thickness of approximately 2.5 µm, this leads to a rotation of approximately 90° of the polarization for visible light. Subsequently, half the layer was irradiated with UV light (365 nm, 20 mW/cm$^2$) for a long period of time via a mask, so that all E isomer of compound B was converted into Z isomer. As a result, the pitch of the cholesterically ordered material became approximately infinite in the irradiated part of the layer, so that, in fact, a nematically ordered material was obtained. The direction of polarization of polarized visible light is not rotated when this light passes through this layer. After polymerization and crosslinking, the layer was removed from the substrate and provided on the exit plane of the system.

It is apparent that patterned polarization rotators can be made by means of the method as described hereinbefore, where the local twist angle of the cholesterically ordered layer and thereby the local rotation of the polarization of a transmitted light beam, is determined by the dose of UV light at that particular position. Lateral resolutions smaller than micron can easily be obtained. Local control of the polarization rotation offers new possibilities in the preparation of optical components. Potential applications are, for example, patterned polarization rotators (as described above), optical data storage media, polarization sensitive gratings, polarization sensitive recordings, or holograms for copy protection.

Moreover, between two polarizers, variations in polarization rotation show up as variations in light transmission. Full grey-scale capability is achieved by adjusting the twist angle in a range of 90 degrees. Preferably, the twist angle is adjusted in the region around 0 degrees, because in this region the polarization rotation has a low wavelength dependence.

Figure 4:
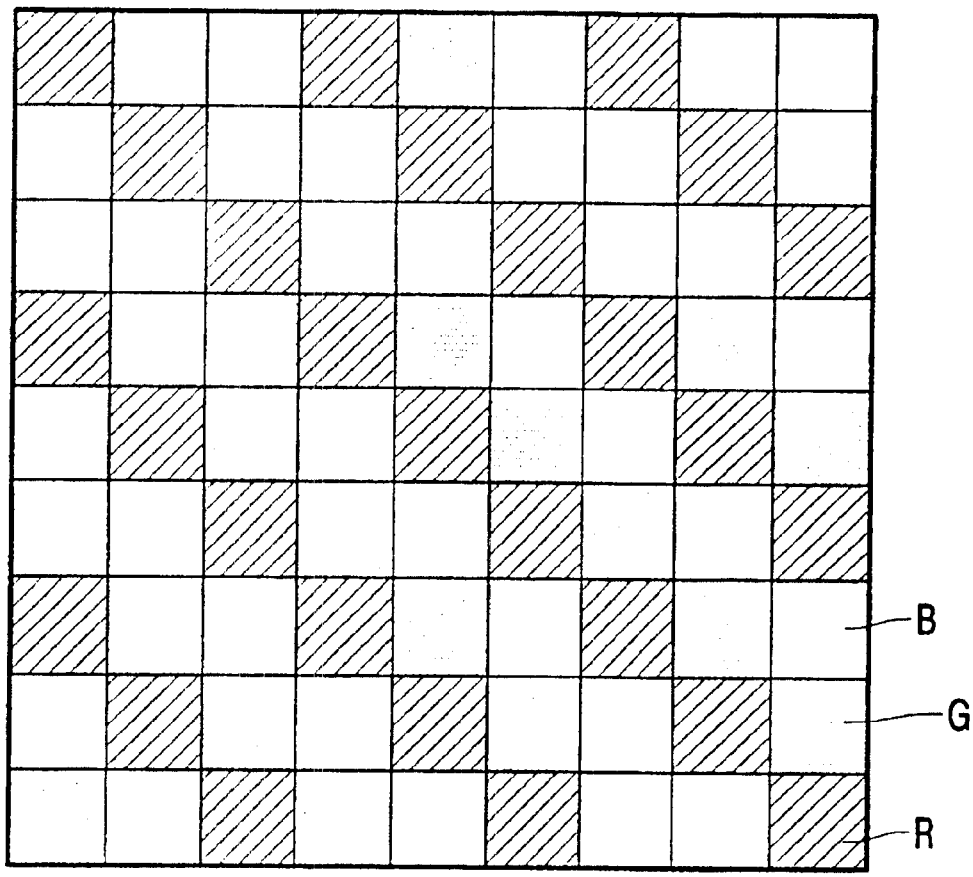
FIG. 4 is a diagrammatic plan view of a color filter with a patterned layer of a polymer material having a cholesteric order, manufactured by means of the method according to the invention.

FIG. 4 is a plan view of a color filter which mainly consists of a 5 µm thick, patterned layer of a polymer material having a cholesteric order. This layer comprises an array of three sub-layers R (red), G (green) and B (blue) which are regularly spread across the layer. The sub-layers had dimensions of 100 µm×100 µm. The pitch of the molecular helix of the cholesterically ordered material in the different sub-layers was 0.28 µm (blue reflection), 0.34 pm (green reflection) and 0.41 µm (red reflection), respectively.

The color filter was manufactured as follows. A substrate was provided with an approximately 5 µm thin layer of compound C in which 15% by weight of the compound B was incorporated. After ordering, the entire layer had a pitch of the molecular helix of 0.28 µm, which yields the desired blue reflection B. Subsequently, two thirds of the layer were irradiated (365 nm, 5.6 mW/cm$^2$) according to a suitable pattern for 90 seconds so that the irradiated areas had a pitch of the molecular helix of 0.34 µm, which yields the desired green reflection G. Subsequently, half of the areas of the layer that had already been irradiated were further irradiated for 90 seconds so that these twice irradiated areas had a pitch of the molecular helix of 0.41 µm, which yields the desired red reflection R. Finally, the complete layer was polymerized and crosslinked by means of electron-beam irradiation. A color filter array suitable for use in a liquid crystal display (LCD) was obtained.

In an alternative preferred embodiment of the method according to the invention of manufacturing the above-mentioned color filter array, a grey-tint mask was used. In this mask, the transmission of the mask apertures intended for the red pixels is 100%, the transmission of the mask apertures intended for the green pixels is 50%, and the UV radiation is completely blocked at the positions intended for the blue pixels. The three envisaged areas having a different pitch can be obtained with this mask in a single irradiation step of 180 sec. Also in this case, the separate pixels had dimensions of 100 µm×100 µm.

The method according to the invention has proved that it is possible to manufacture a patterned layer of a polymer material having a cholesteric order, in which the layer has juxtaposed areas where the pitch of the molecular helix differs from that of another area. This method has proved that it is possible to manufacture patterned cholesteric layers for use in a polarization conversion system and a color filter.

However, the method according to the invention may also lead to a layer of a cholesterically ordered polymer material, in which the material is oriented in such a way that the axis of the molecular helix of the cholesterically ordered material extends transversely to the layer, and the pitch of the molecular helix is made to vary transversely to the layer. The method to obtain such a layer, as claimed in claim 3, will be elucidated with reference to FIG. 1. This Figure shows a substrate 1 of, for example, glass, a main surface of which is provided with an orientation layer (not shown) of, for example, polyimide. A layer of a liquid crystalline material 2 having a thickness of approximately 10 µm is provided on this layer by means of a thick-film technique (doctor blade coating or spin-coating). This layer is given a cholesteric order by means of the orientation layer. The material is oriented in such a way that the molecular helix of the cholesterically ordered material extends transversely to the layer.

In the relevant case, the liquid crystalline material consisted of a mixture of 98% by weight of M15, a copolymer with 15 mol % of menthone units (compound 2F), and 2% by weight of an UV absorber (tinuvin 1130, Ciba specialty Chemicals). The chemical structural formulas of some of these compounds are shown in FIG. 2. The copolymer induces the formation of the molecular helix in the liquid crystalline material so that the desired cholesteric order is obtained. In the case described, the helix had a pitch of approximately 0.3 µm.

Subsequently layer 2 was irradiated at ambient temperature in air (containing the normal amount of oxygen) for 10 minutes using UV radiation (365 nm, 2.8 mW/cm$^2$). Due to this irradiation, a part of the isomerizable, chiral compound B in the irradiated layer was converted from the E form to the Z form. Consequently, the color of the layer shifts towards longer wavelengths (red shift).

Figure 5:
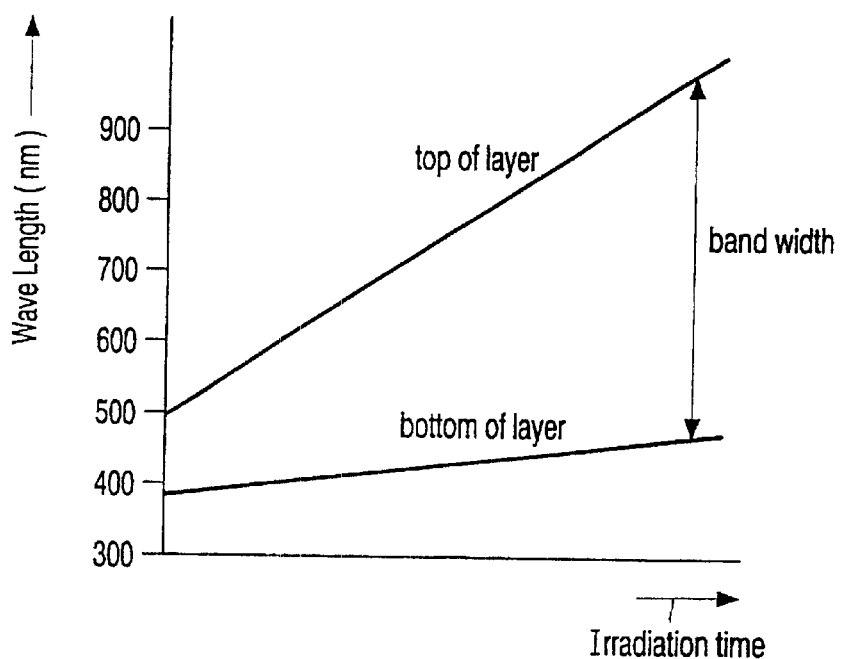
FIG. 5 illustrates the broadening of the reflection band as a function of the irradiation time, and FIG. 6 shown the reflection spectra of a broadband polarizer.
Figure 6:
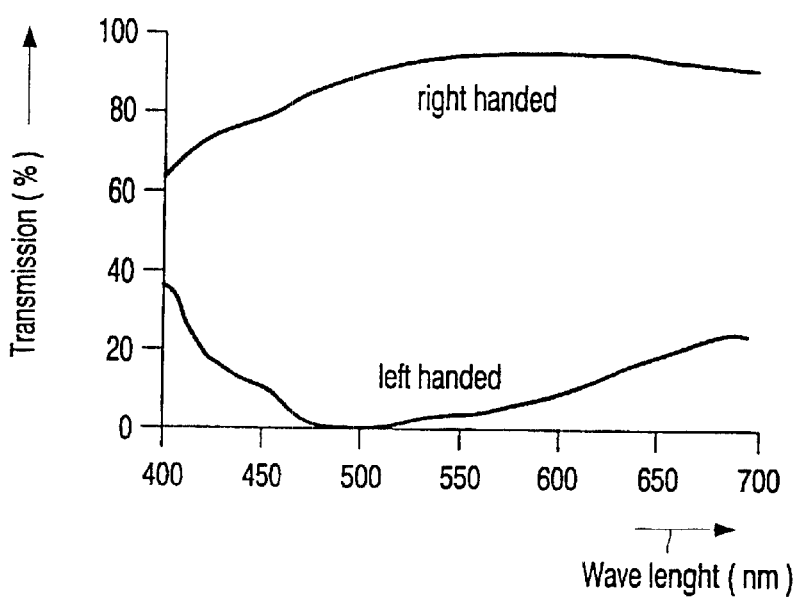

Due to the presence of the UV absorber, the intensity of the radiation in the cholesteric layer shows a gradient transverse to the layer. The top of the sample receives more UV light than the bottom of the sample, resulting in a gradient in the amount of converted isomerizable compound. This gradient yields a corresponding gradient in the pitch of the helix of the cholesteric layer. Consequently, the red shift at the bottom of the layer is lower than the red shift at the top of the layer, causing a broadening of the reflection band as demonstrated in FIG. 5.

After establishing the required reflection band, the layer was irradiated with an electron-beam in a nitrogen atmosphere. As a result, crosslinking of the liquid crystalline material took place.

The polymerization and/or crosslinking step may alternatively be accomplished by means of actinic radiation when a small amount of a photo-initiator is added to the mixture of liquid crystalline material. If the photo-initiator is activated by light having the same wavelength as that used for process step b, then step b and step c can be performed simultaneously.

For example, a liquid crystalline material consisted of a mixture of 15% by weight of menthone-acrylate (compound 2A), 82% by weight of RM257 (compound 2C), 2 % by weight of an UV absorber (tinuvin 1130, Ciba Specialty Chemicals), 1% by weight of a photo-initiator (Darocure 4265, Ciba Specialty Chemicals), and 300 ppm of an inhibitor (methoxyfenol). The chemical structural formulas of some of these compounds are shown in FIG. 2. A layer of this mixture is provided on a substrate, which comprises an orientation layer of, for example, polyimide. This layer is given a cholesteric order by means of the orientation layer. The material is oriented in such a way that the molecular helix of the cholesterically ordered material extends transversely to the layer.

Subsequently, the layer was irradiated for 3 minutes using UV radiation (365 nm, 6 mW/cm$^2$). Due to this irradiation, a part of the isomerizable, chiral compound A in the irradiated layer was converted from the E form to the Z form. Consequently, the color of the layer shifts towards longer wavelengths (red shift). Due to the presence of the UV absorber, the intensity of the radiation in the cholesteric layer shows a gradient transverse to the layer, resulting in a gradient in the pitch of the helix of the cholesteric layer, causing a broadening of the reflection band. Due to the photo-initiator, the polymerization and crosslinking reaction is initiated. This reaction is hampered by an inhibitor in order to allow the pitch and the gradient in the pitch of the helix of the cholesteric layer to be developed before the three-dimensional network is formed.

When the polymerization and/or crosslinking step is accomplished by means of actinic radiation, and process steps b and c should be disentangled, process step b may be performed in an oxygen atmosphere which hampers the polymerization and crosslinking if the selected activated initiator is quenched by the oxygen in the ambient atmosphere. For initiating said crosslinking, the irradiation process in accordance with step c is performed in a nitrogen atmosphere.

In another example, a mixture is made of 15% by weight of menthone-acrylate (compound 2A), 82% by weight of RM257 (compound 2C), 2% by weight of an UV absorber (tinuvin 1130, Ciba Specialty Chemicals), 1% by weight of a photo-initiator (Darocure 4265, Ciba Specialty Chemicals). Said mixture is deposited as a thin film on a substrate, and subsequently irradiated with UV light (365 nm, 1 mW/cm$^2$) during 5 minutes. The irradiation is performed under ambient atmosphere (air, containing the usual amount of oxygen). Due to this irradiation, a part of the isomerizable, chiral compound A in the irradiated layer was converted from the E form to the Z form. Consequently, the color of the layer shifts towards longer wavelengths (red shift). Due to the presence of the UV absorber, the intensity of the radiation in the cholesteric layer shows a gradient transverse to the layer, resulting in a gradient in the pitch of the helix of the cholesteric layer, causing a broadening of the reflection band. Due to the photo-initiator, the polymerization and crosslinking reaction is initiated. This reaction is hampered by the oxygen in the ambient atmosphere.

When the desired pitch and the gradient in the pitch of the helix of the cholesteric layer is established, the layer is polymerized and crosslinked using 405 nm UV light (4 mW/cm$^2$) in a nitrogen atmosphere. At this wavelength, the photo-initiator Darocure 4265 can be activated without substantial conversion of the isomerizable compound A. During this irradiation the layer is polymerized and crosslinked with substantially no change in the pitch of the molecular helix in the layer.

It is apparent that a broadband polarizer can be made by means of the method as described hereinbefore. Said broadband polarizer comprises a layer of a polymer material having a cholesteric order, the material being oriented in such a manner that the axis of the molecular helix extends transversely to the layer, and the pitch of the molecular helix in the layer is varied In general, the invention relates to a method of manufacturing a patterned layer of a polymer material having a cholesteric order, in which the material is oriented in such a way that the axis of the molecular helix of the cholesterically ordered material extends transversely to the layer, and in which the layer comprises at least one region in which the pitch of the molecular helix differs from that of another region. This inventive method comprises the following steps:

a. providing a layer of a cholesterically ordered material comprising a quantity of a convertible compound which in its non-converted and in its converted state determines the pitch of the cholesterically ordered material to a different extent, in which the conversion of said compound may be induced by radiation, b. irradiating the layer in accordance with a desired pattern so that at least a part of the convertible compound in the irradiated parts of the layer is converted, c. polymerizing and/or crosslinking the cholesterically ordered material to form a three-dimensional polymer.

The convertible compound preferably comprises an isomerizable, chiral compound. Polymerization and/or crosslinking are preferably induced by irradiation using electron-beam radiation or actinic radiation.

What is claimed is:

1. A method of manufacturing a patterned layer of a polymer material having a cholesteric order, in which the material is oriented in such a way that the axis of the molecular helix of the cholesterically ordered material extends transversely to the layer, and the layer is patterned in that it has least an area in which the pitch of the molecular helix differs from that of another area, wherein the method comprises the steps of:

a. providing a layer of a cholesterically ordered material comprising a quantity of a convertible compound which in its non-converted and in its converted state determines the pitch of the cholesterically ordered material to a different extent, transverse to the layer, in which the conversion of said compound may be induced by radiation, b. irradiating the layer in accordance with a desired pattern so that at least a part of the convertible compound in the irradiated parts of the layer is converted, c. polymerizing and/or crosslinking the cholesterically ordered material to form a three-dimensional polymer.

2. A method as claimed in claim 1, wherein the irradiation in accordance with step b is performed such that the irradiation dose is different for at least two different areas of the layer.

3. A method of manufacturing a layer of a cholesterically ordered polymer material, in which the material is oriented in such a way that the axis of the molecular helix of the cholesterically ordered material extends transversely to the layer, wherein the method comprises the following steps:

a. providing a layer comprising a cholesterically ordered material, which material comprises a quantity of a convertible compound which in its non-converted and in its converted state determines the pitch of the cholesterically ordered material to a different extent, transverse to the layer, the conversion of said compound being inducible by radiation, and the layer substantially absorbs said radiation, b. irradiating the layer so that at least a part of the convertible compound in the irradiated parts of the layer is converted, c. polymerizing and/or crosslinking the cholesterically ordered material to form a three-dimensional polymer.

4. A method as claimed in claim 3, wherein the irradiation dose in accordance with step b decreases from the top to the bottom of the cholesteric layer, is characterized in that, at the bottom of the cholesteric layer, said irradiation dose is less than 0.9 times the irradiation dose at the top of said layer.

5. A method as claimed in claim 3, wherein at the bottom of the cholesteric layer, the irradiation dose in accordance with step b is less than 0.75 times the irradiation dose at the top of said layer.

6. A method as claimed in claim 1, wherein the irradiation in accordance with step b is performed via a mask having a number of apertures which have different transmissivity to the radiation used.

7. A method as claimed in claim 1, wherein the convertible compound comprises an isomerizable, chiral compound.

8. A method as claimed in claim 1, wherein the polymerization and/or crosslinking is initialized and/or catalyzed by the addition of an initiator or catalyst from the fluid or gaseous phase.

9. A method as claimed in claim 1, wherein the polymerization and/or crosslinking is induced by a thermally decomposable initiator.

10. A method as claimed in claim 1, wherein the polymerization and/or crosslinking is effected by means of electron-beam irradiation.

11. A method as claimed in claim 1, wherein the polymerization and/or crosslinking is effected by exposure to actinic radiation.

12. A method as claimed in claim 11, wherein the irradiation in accordance with step b is performed at a temperature at which the polymerization and/or crosslinking reaction is substantially hampered.

13. A method as claimed in claim 11, wherein the irradiation in accordance with step b is performed by means of radiation which is substantially inert with respect to the initiation of the polymerization and/or crosslinking reaction.

14. A method as claimed in claim 11, wherein the irradiation in accordance with step b is performed in an atmosphere which substantially hampers the polymerization and/or crosslinking reaction.

15. A layer of a cholesterically ordered polymer material, in which the material is oriented in such a way that the axis of the molecular helix of the cholesterically ordered material extends transversely to the layer, which layer comprises a quantity of a convertible compound which in its non-converted and in its converted state determines the pitch of the cholesterically ordered material to a different extent, and which layer comprises at least one region in which the pitch of the molecular helix differs from that of another region, wherein the material is oriented in such a way that the axis of the molecular helix of the cholesterically ordered material extends transversely to the layer, and the pitch of the molecular helix varies transversely to the layer.

16. An information carrier comprising a patterned layer of a polymer material having a cholesteric order, as claimed in claim 15.

17. A polarization conversion system comprising a patterned layer of a polymer material having a cholesteric order, as claimed in claim 15.

18. A color filter comprising a patterned layer of a polymer material having a cholesteric order, as claimed in claim 15.

19. A polarizer comprising a layer of a polymer material having a cholesteric order, as claimed in claim 15.

* * * * *